Nov. 6, 1951     A. M. MEYER     2,573,922
AUTOMATIC GRIPPING SPATULA
Filed Dec. 12, 1949
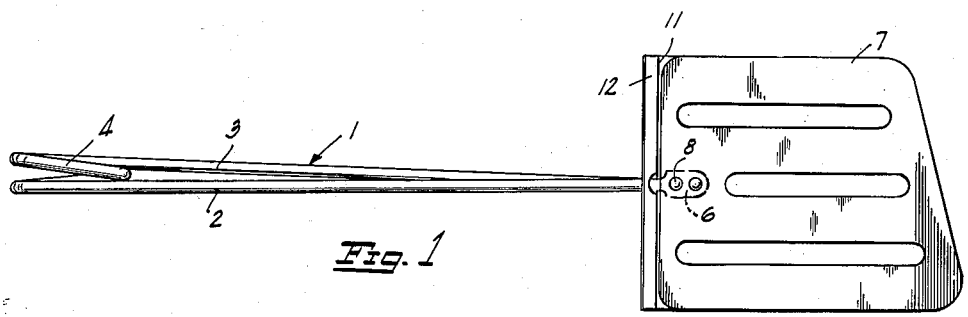
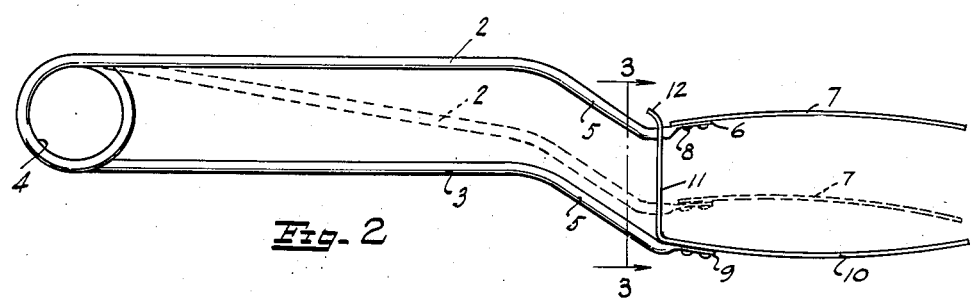
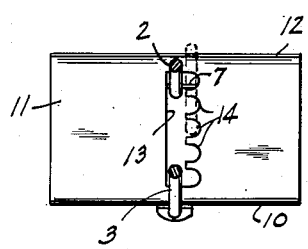
AUGUST M. MEYER
INVENTOR.
BY James D. Givnan
ATT'Y Patented Nov. 6, 1951

2,573,922

UNITED STATES PATENT OFFICE 2,573,922

AUTOMATIC GRIPPING SPATULA

August M. Meyer, Camas, Wash.

Application December 12, 1949, Serial No. 132,521

1 Claim. (Cl. 294—99)

This invention relates to improvements in culinary utensils and more particularly to a utensil especially designed and adapted for use in the handling and inverting of food during its cooking or frying process such as in frying hotcakes, meat, steaks, and the like.

It is one of the principal objects of the invention to provide a device of this character comprising a pair of gripping plates of arcuate shape mounted upon the terminal ends of a pair of spring actuated tongs and also the provision of means formed in one of said plates cooperating with one of said tongs for locking said tong and its related plate in various positions with respect to the other plate for gripping the food between said plates.

These and other objects will appear as my invention is more fully hereinafter described in the following specification, illustrated in the accompanying drawings and finally pointed out in the appended claim.

In the drawing:

Figure 1 is a top plan view of a utensil made in accordance with my invention.

Figure 2 is a side elevation of Figure 1.

Figure 3 is a sectional end elevation taken approximately along the line 3—3 of Figure 2.

Referring now more particularly to the drawing:

Reference numeral 1 indicates, generally, a handle in the form of a pair of tongs indicated at 2 and 3 made of a single strand of spring wire and looped back on itself to form a coil spring 4 which urges the tongs into the separated positions shown in full lines in Figures 2 and 3. The outer ends of the tongs are offset downwardly as indicated at 5 and the terminal end of the tong 2 is flattened as at 6 for attachment to an upper plate 7, of arcuate shape in side elevation, either by rivets 8, as shown, or by spot welding or any other approved means.

The terminal end of the tong 3 is likewise flattened as at 9 and similarly secured to a companion bottom plate 10 of reverse arcuate shape whose rearward portion is turned upwardly into a vertical wall 11 whose top edge is curved rearwardly as at 12. The wall 11 is formed with a vertical slot 13, and one vertical edge of the slot is formed with a plurality of notches 14.

The tong 2 extends through the slot 13 and is movable throughout the length thereof for permitting movement of both tongs and their respective arcuate plates toward and away from each other. By the arrangement of the coil spring 4 the tong 2 is urged to the right as viewed in Figure 3 so that when released from the grip of the user it will engage itself within one of the notches 14 and lock the plates in the selected spaced relation to each other, for example as shown in dotted lines in Figure 2.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A culinary utensil comprising in combination, a pair of tongs formed of a single strand of spring wire looped into a coil spring intermediate its ends and folded back on itself into substantially parallel relation to each other, a plate secured to the outermost end of each of said tongs and arranged one above the other, each of said plates being of arcuate shape in longitudinal cross section, the bottom one of said plates having its rearward portion turned upwardly into a vertical wall, a vertical slot formed in said wall and closed at both of its ends, one edge of said slot having notches formed therein, one of said tongs extending through said slot and being urged into selective engagement with said notches for maintaining said plates in selective spaced relation to each other.

AUGUST M. MEYER.

REFERENCES CITED

The following references are of record in the file of this patent:

UNITED STATES PATENTS

| Number | Name | Date |
|---|---|---|
| 573,574 | Davies | Dec. 22, 1896 |
| 1,962,570 | Nelson et al. | June 12, 1934 |
| 2,011,497 | Miller | Aug. 13, 1935 |
| 2,201,566 | Voelker | May 21, 1940 |
| 2,263,965 | Fiori | Nov. 25, 1941 |